United States Patent [19]

Jackson

[11] Patent Number: 4,814,631
[45] Date of Patent: Mar. 21, 1989

[54] ELECTRICAL POWER SUPPLY HAVING A VARIABLE OUTPUT

[76] Inventor: Terry R. Jackson, P.O. Box 6079, Hay St. East, Perth, Australia

[21] Appl. No.: 290,773

[22] Filed: Aug. 6, 1981

[30] Foreign Application Priority Data

Aug. 6, 1980 [AU] Australia .............................. PE4902
Aug. 6, 1980 [AU] Australia .............................. PE4903
Apr. 14, 1981 [AU] Australia .............................. PE8488

[51] Int. Cl.⁴ .......................... H02J 3/00; H02P 3/00
[52] U.S. Cl. .................................... 307/53; 307/71; 307/81; 320/7; 320/16; 318/139
[58] Field of Search ............ 307/71, 53, 55, 80, 307/81, 130, 131, 66, 191; 320/6, 7, 15–19, 32, 43, 48; 361/414; 318/106, 440, 139

[56] References Cited

U.S. PATENT DOCUMENTS

| | | | |
|---|---|---|---|
| 3,207,966 | 9/1965 | Parkinson | 307/71 |
| 3,249,836 | 5/1966 | Stamm | 318/139 |
| 3,339,079 | 8/1967 | Kessler | 307/81 |
| 3,387,194 | 6/1968 | Banks | 318/139 |
| 3,459,957 | 7/1967 | Kelley | 307/71 |
| 3,740,678 | 6/1973 | Hill | 361/414 |
| 3,809,978 | 5/1974 | Zubris | 318/139 |
| 3,875,478 | 4/1975 | Capstick | 361/414 |
| 4,052,647 | 10/1977 | Thompson | 318/139 |
| 4,158,158 | 6/1979 | Burkett | 318/139 |
| 4,282,465 | 8/1981 | Acker et al. | 318/139 |
| 4,290,109 | 9/1981 | Taniguchi et al. | 320/32 |
| 4,297,590 | 10/1981 | Vail | 307/81 |
| 4,363,999 | 12/1982 | Preikschat | 318/139 |

FOREIGN PATENT DOCUMENTS 1051588 9/1962 United Kingdom .

*Primary Examiner*—A. D. Pellinen
*Assistant Examiner*—Todd E. De Boer
*Attorney, Agent, or Firm*—Harness, Dickey & Pierce

[57] ABSTRACT

An electrical power supply having a variable output, the power supply comprising one pair of sources of e.m.f., these sources being interconnected in parallel, each portion of the parallel circuit comprising the source being connected in series with a diode, a switch interconnecting junction between each source and the diode and a controller sensitive to the requirements of the load connected to the power supply and being adapted to operate switch such that on the switch being open the sources are connected in parallel and on the switch being closed the sources are connected in series.

17 Claims, 6 Drawing Sheets

ELECTRICAL POWER SUPPLY HAVING A VARIABLE OUTPUT

THIS INVENTION relates to an electrical power supply having a variable output and a means of controlling the power supply.

In one form the invention resides in an electrical power supply having a variable output, said power supply comprising one pair of sources of e.m.f., said sources being interconnected in parallel, each portion of the parallel circuit comprising the source being connected in series with a diode means, a switch interconnecting junction between each source and the diode means and a control means sensitive to the requirements of the load connected to the power supply and being adapted to operate said switch such that on said switch being open said sources are connected in parallel and on said switch being closed said sources are connected in series.

According to a preferred feature of the invention there are at least two pairs of sources of e.m.f. and wherein each pair are connected in parallel with each other and each portion of the parallel circuit comprises a diode means connected in series with each pair, the opposite poles of each pair being interconnected by a second switch which is operated by said control means.

According to a preferred form the switches and diode means are mounted to a base comprising a laminate sheet formed of a central sheet of electrical insulating material and having bonded to each face a sheet of heavy duty electrically conductive material wherein each sheet of electrically conductive material is inherently load supportive, and each electrical conductive sheet is formed with a discontinuous pattern which exposes the central sheet; said switches and diode means being fixed to said base such that one of said conductive sheets is connected to one of the terminals of said components and the other is connected to the other of the terminal of the components and wherein the nature of the pattern on each sheet and the interconnection therebetween and the components corresponds to the desired electrical interconnection between said diodes, switches and sources for said electrical power supply, the mounting of said switches and diodes also providing the electrical connection to the base.

According to a preferred feature of the invention the control means is capable of overriding a manual control for said e.m.f. and said control means comprising; a sensor to sense the magnitude of current from said source to said load; and a switching means connected to said sensor and to said load, wherein on said current exceeding a predetermined value, the controller switch will lower the e.m.f. of said source to a level which will produce a current below said predetermined level, said switching means subsequently permitting said e.m.f. to increase to that set by the resultant manual control provided the current does not exceed said predetermined value.

The invention will be more fully understood in the light of the following description of one specific embodiment. The description is made with reference to the accompanying drawings of which;

Figure 1:
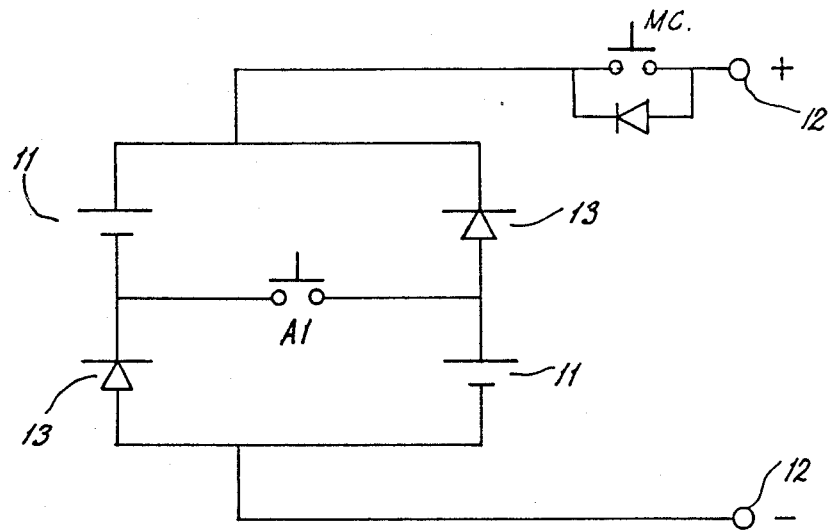
FIG. 1 is a schematic circuit diagram of a first embodiment having a two step voltage output.

The first embodiment is shown at FIG. 1 comprises a two step circuit which is capable of providing a voltage output of 6 volts or 12 volts. The circuit comprises a pair of 6 volt cells 11 which are connected in parallel and at each side of the parallel circuits are provided with output poles 12. Within each parallel loop of the parallel circuit a diode 13 is connected in series with each cell 11 and a switch A1 interconnects junctions of each cell 11 and its respective diode 13. The circuit also includes a master switch MC connected between the power supply and load. Table 1 below sets out the switching arrangements for the circuit.

TABLE 1

| Switch | Step 1 6v | Step 2 12v |
| --- | --- | --- |
| A1 | X | O |
| MC | O | O |

In the above table and subsequent tables, the reference X refers to an open switch and O refers to a closed switch.

When the switch A1 is open both cells 11 are in parallel with each other and the resultant voltage output at the poles 12 is approximately 6 volts. Upon closing switch A1, the cells 11 are connected in series with each other through the switch and the resultant voltage output at the poles 12 volts. It will be noted that the circuit is not broken when a voltage change is made.

When the cells are connected in parallel there is a small voltage drop over the diodes 13 which are connected in series with each cell 11. On the closing of the switch A1 the cells 11 are interconnected in series and are in direct interconnection with the load while the diodes 13 are also interconnected in series but are in parallel with the cells 11. As a result when the cells are connected in series there is no voltage drop and the full voltage is applied to the load.

The second embodiment comprises a duplication of the first embodiment wherein two pairs of cells 11 of the first embodiment are interconnected themselves in parallel. Each loop of the parallel network incorporates a diode 13 connected in series with the pair of cells 14 and a second switch B1 interconnects the junction between the diode 13 and each pair of cells 14. The switches are of the normally closed type. For convenience the switches for each pair of cells 14 have been labelled A1, A2 and B1 respectively. The preferred various switching patterns available for switches A1, A2 and B1 to produce the different voltage outputs are set out in Table 2. Where a switching pattern (eg; 12V) results in equal utilisation of the cells it is not necessary to utilise any other switching pattern. It only becomes necessary to consider alternative switching patterns where the available patterns result in unequal utilisation of the cells. Another important criterion in choosing a preferred pattern lies in the number of normally closed switches which must be maintained open.

TABLE 2

| Switch | Step 1 6v | 2 12v | 3 18v | 4 24v |
|---|---|---|---|---|
| A1 | X | O | OX | O |
| A2 | X | O | XO | O |
| B1 | X | X | OO | O |
| MC | O | O | OO | O |

When each of the switches A1, B1 and A2 are open each of the cells 11 within each pair 14 are in parallel with each other and each pair of cells 14 are also in parallel with each other and as a result, the resultant output of the circuit is 6 volts. When switches A1 and A2 are closed the cells 11 in each pair 14 are interconnected in series with each other and each pair of cells 14 are connected in parallel with each other and as a result the output at the poles 12 is 12 volts. When either switch A1 or A2 is closed together with switch B1 the cells 11 associated with the closed switch are connected in series while the cells 11 associated with the open switch are connected in parallel, however by virtue of the closing of switch B1 the pairs of cells 14 are interconnected in series therefor, the resultant output at the poles is 18 volts. Time sharing switching is necessary at level 3 to achieve equal cell utilisation. On all of the switches being closed the cells within each pair of cells 14 are connected in series while each pair of cells 14 are also connected in series and therefore the resultant output of the circuit is 24 volts.

A small voltage drop will occur when any cell or pair of cells are connected in parallel due to the presence of a diode in series with the appropriate cell or pair of cells. The maximum voltage drop will be the sum of voltage drops across the diodes 13 and 15 and this will only exist when all switches A1, A2 and B1 are open.

Figure 3:
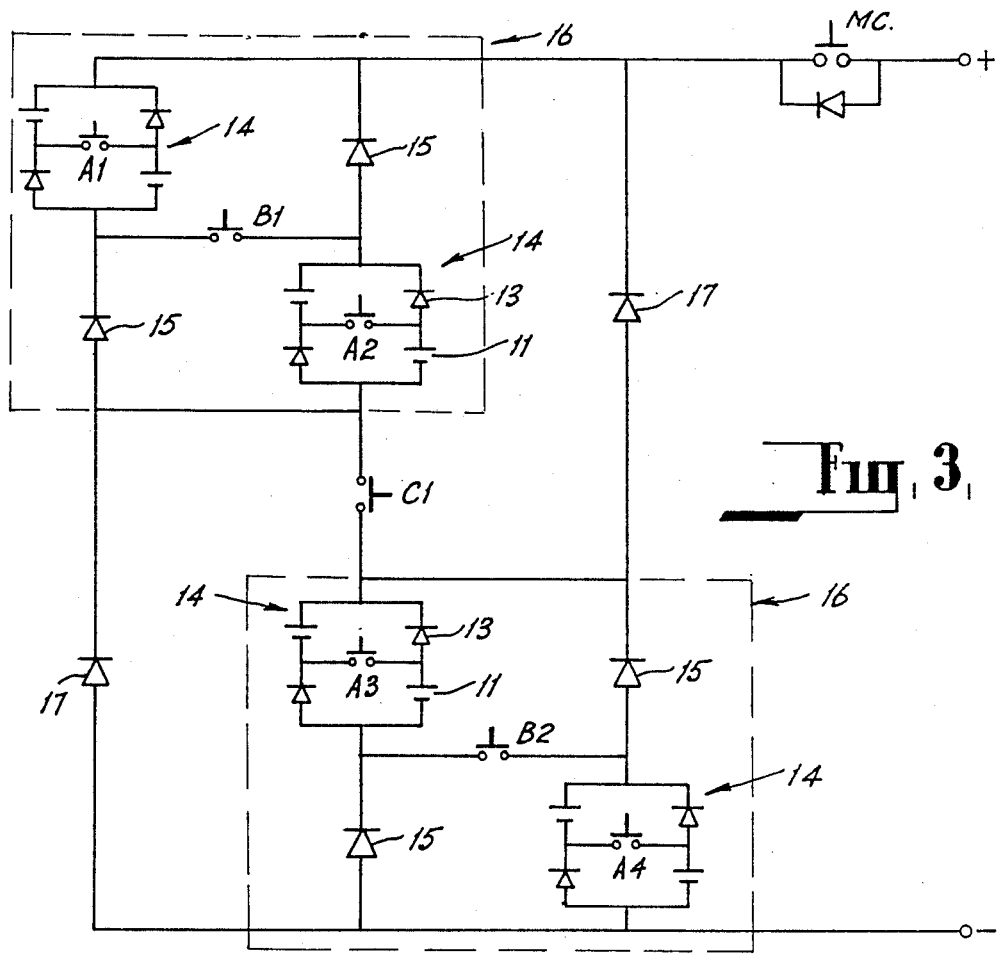
FIG. 3 is a schematic circuit diagram of a third embodiment having an eight step voltage output.

The third embodiment as shown at FIG. 3 comprises a duplication of the embodiment of FIG. 1 wherein two sets 16 of the two pairs of cells 14 are interconnected in parallel and each loop of the parallel circuit comprises a diode 17 connected in series with the respective set of cells 16 and the junctions between the diode 17 and the sets of cells 16 are interconnected by a switch C1. The switches are of the normally closed type. The preferred various switching patterns which are possible in order to produce the various voltage outputs are set out in Table 3. Where a switching pattern (eg; 12V) results in equal utilisation of the cells, it is not necessary to utilize alternative switching patterns. It only becomes necessary to consider alternative switching patterns where the available pattern result in unequalutilsation of the cells. In choosing any switching pattern it is desirable to choose that pattern involving the least number of open switches, which require power to remain open and involve the least voltage drop across series connected diodes.

TABLE 3

| Switch | Step 1 6v | 2 12v | 3 18v | 4 24v | 5 30v | 6 36v | 7 42v | 8 48v |
|---|---|---|---|---|---|---|---|---|
| A1 | X | O | OX | O | OXXX | OO | XOOO | O |
| A2 | X | O | XO | O | XOXX | OO | OXOO | O |
| A3 | X | O | OX | O | XXOX | OO | OOXO | O |
| A4 | X | O | XO | O | XXXO | OO | OOOX | O |
| B1 | X | X | OO | O | OOOO | XO | OOOO | O |
| B2 | X | X | OO | O | OOOO | OX | OOOO | O |
| C1 | X | X | XX | X | OOOO | OO | OOOO | O |
| MC | O | O | OO | O | OOOO | OO | OOOO | O |

By a selection of switches as shown in the Table 3, it is possible to obtain any one of eight different voltage levels varying from 6 volts to 48 volts in 6 volt increments. A time sharing switch is desirable at levels 3, 5, 6 and 7 in order that a statistically equal usage is made of each cell.

The power supply of the third embodiment is intended for use in an electrically powered vehicles and each of the steps 1 to 8 is available to the driver via an accelerator pedal lever or like means.

A small voltage drop will occur when any cell or pair of cells or group of cells is connected in parallel due to the presence of a diode in series with the appropriate cell, and/or pair of cells and/or group of cells. The maximum voltage drop will be the sum of the voltage drops across the diodes 13, 15 and 17 and this will only take place when all the switches are open.

Figure 2:
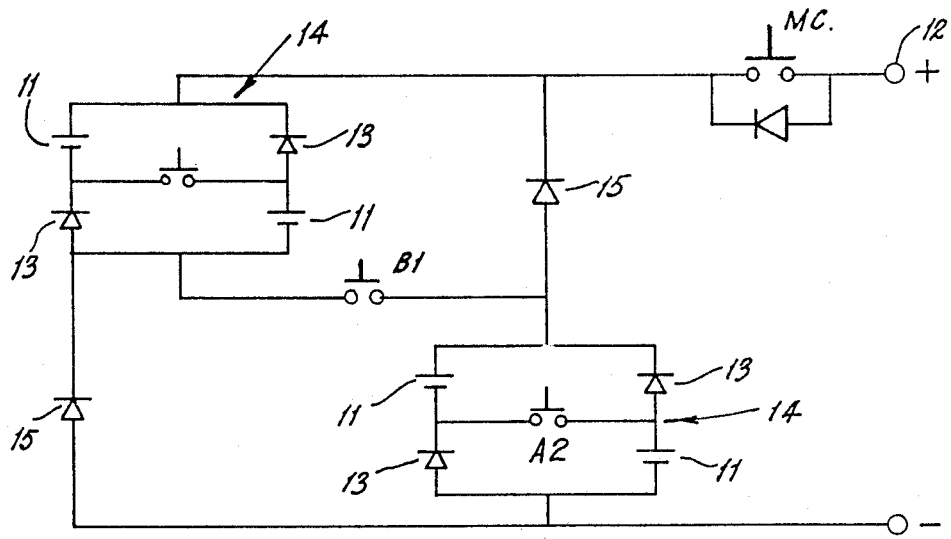
FIG. 2 is a schematic circuit diagram of a second embodiment having a four step voltage output.
Figure 9:
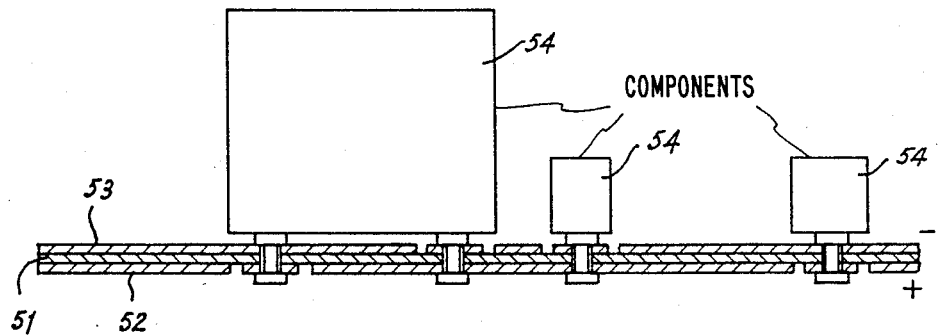
FIG. 9 is a schematic part sectional elevation of a mounting for the circuit components of the embodiments of FIGS. 1, 2 and 3.

By further duplication of the circuits shown in FIGS. 1, 2 and 3, it is possible to gain any desired number of voltage possiblities having incremental variations of six volts. Each of the circuit components (other than the cells) of the embodiments described above is mounted to a base, a form of which is shown schematically at FIG. 9.

The base is capable of; physically supporting all of the components; providing the desired electrical connection between the components; and providing an adequate heat sink for dissipating excessive heat produced at one or more of the required components. The components involved with the circuits referred to in each of the above embodiments include diodes and solenoid operated switches. To support each of these components, the base is formed as a laminate sheet having a central sheet 51 formed of glass reinforced plastic or like electrical insulating material which has its own inherent structural strength and which has bonded to each face a sheet of metal such as copper or like electrically conductive material wherein said sheet is of a sufficient thickness to provide additional support to the central sheet. Each sheet 52 and 53 is milled out in a discontinuous pattern to provide the maximum area of metal and to provide the necessary circuitary interconnection between the electrical terminals of the components to be mounted to the base. Holes are provided at the desired locations through the sheet to support each of the electrical components and provide the electrical connection for the terminals thereof. The diameters of the holes vary depending upon the polarity of the terminals to be accommodated. In the case of the base shown in the drawing, the negative terminals of the component are of a smaller diameter and utilise smaller diameter holes than the positive terminals of the components. Each component 54 is then fixed into place by locating the terminals of the components into the appropriate holes formed in the base. The terminals of each component pass through the base and are located into place using threaded nuts, screws of like means. Where a terminal passes through the base, the sheet of metal 52 and 53 which has the opposite polarity to that of the terminal is milled out to provide a washer-like connection point 54 which is isolated from the remainder of the sheet.

As a result, a base is provided which has the necessary structural strength to support the massive electronic components to be carried on it and serve as an adequate heat sink for the components thereon. In addition, the use of the base simplifies the assembly of a complicated electrical circuit.

If desired, the face of the base remote from the components may be overlaid by a further sheet of glass reinforced plastic or like electrical insulating material which may then have a low current conductive film formed on it in a desired discontinuous pattern to provide connections to the solenoids and provide voltage and current checkpoint for the circuit. This low current circuit may also be used to incorporate micro-electronic components which are required in association with the electrical circuit referred to above to control the operation of the circuit as discussed below.

The embodiment of FIG. 3 is associated with a manual control (ie; accelerator) for providing an output according to the needs of the user and a control means for preventing excessive currents being drawn by misuse of the manual control and equalising use of each cell.

As discussed in relation to the third embodiment, in a number of cases a particular value of e.m.f. may be obtained from a number of different switching states.

Figure 4:
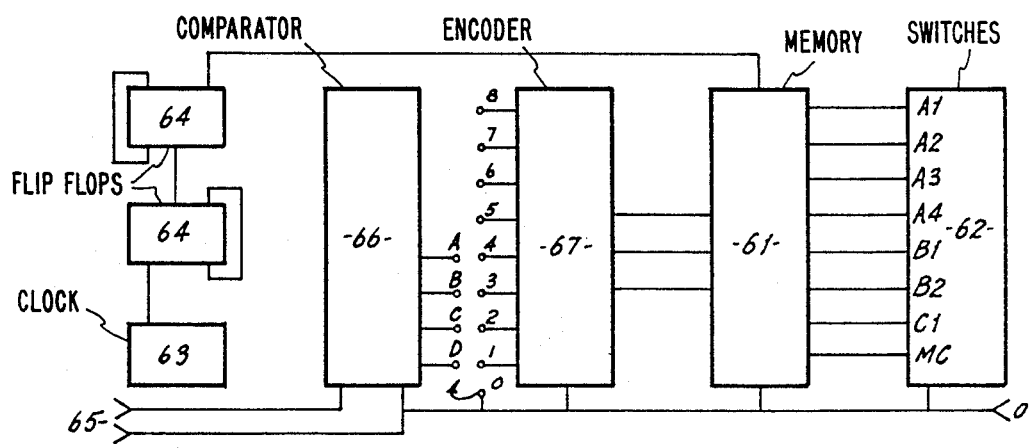
FIG. 4 is a block circuit diagram of one form of control means suitable for use with the third embodiment of FIG. 3.

One form of control means is shown at FIG. 4. The control means of FIG. 4 comprises a programmed memory 61 which is connected to the set of switches 62 for the variable source of e.m.f. of the third embodiment. The memory contains each of the preferred switching states capable for each value of e.m.f. available from the source as shown at Table 3. The memory 61 is also connected to a timing and counting circuit comprising a clock circuit 63 and a pair of flip-flops 64 by which the memory is capable of periodically and sequentially switching to each of the alternative switching states for a set value of e.m.f. to equalise the utilisation of the cells in the source.

The control means also has a facility of preventing an excess current delivery from the source to the load. Such an excess delivery can not only damage the load but can reduce the life of the cells. An overload of excessive current can occur where the manual control is set to the highest e.m.f. value in a situation where the load which is an electric motor is stationary. In order to prevent excessive current the control means utilises a sensor such as a Hall effect device, (Hall probe) or shunt sensor (not shown) which senses the magnitude of the current. The sensor is connected via an input 65 to a comparator 66.

The comparator 66 is connected to the memory 61 via a low order priority input encoder 67 whereby on activation of the comparator the encoder will switch the set output for the source as contained in the memory to one of four levels which are below the output set by the manual control. For example, terminals A, B, C and D of the comparator can be connected to terminals 4, 3, 2 and 1 respectively of the encoder. More than four levels can be provided if desired. The four levels to which the memory can be switched are inversely proportional to the degree of current excess applied to the load and on being switched to one of the levels the memory will be subsequently periodically switched through the other higher levels and then to the level set by the manual control as the patented overload condition is overcome by increased rotational speed of the electric motor.

In use, if the electric motor is stationary and if the manual control is set to a maximum output the current flow to the motor will be excessive. This excessive current will be sensed by the sensor and will cause the comparator through the encoder to switch the memory to the lowest of the four output levels set by the comparator (eg; Output D to 1 in FIG. 4). As a result the current flow to the motor is within suitable limits and the motor begins to rotate. After a period of time when the current level to the motor has obtained a satisfactory level the comparator then switches the memory to the next highest level (eg; Output C to 2), then to the next level (Output B to 3) then to the next level (Output A to 4) and finally permits the Memory 61 to return to the output set by the manual control. During this period, the electric motor has gathered rotational speed such that it can accept the maximum e.m.f. of the source without drawing an excessive current. If an overload does exist when the memory returns to the switching state set by the manual control the comparator through the encoder will switch the memory to the appropriate level depending upon the degree of overload.

Figure 5:
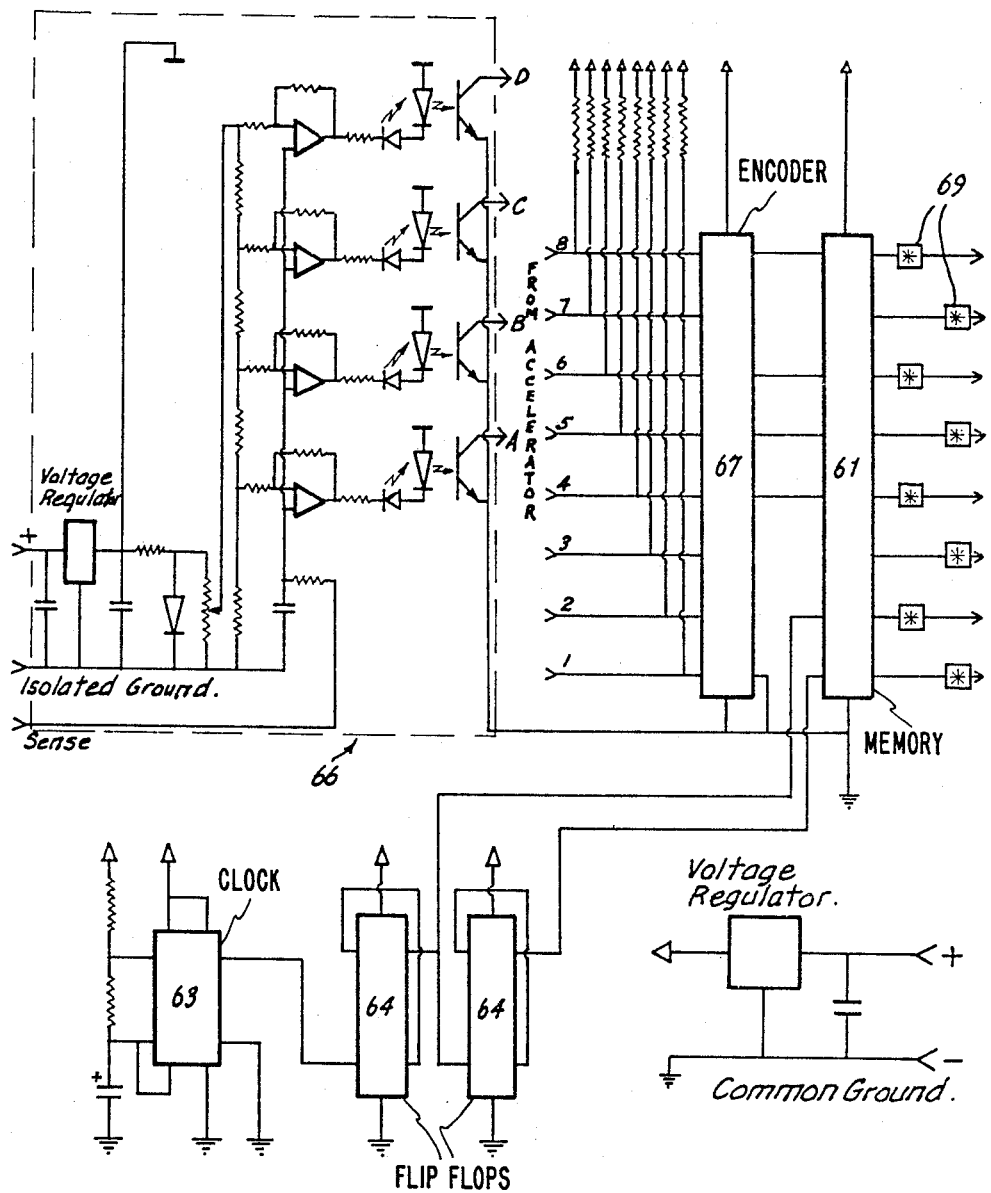
FIG. 5 is a specific example of a circuit meeting the requirements of the circuit of FIG. 4.
Figure 6:
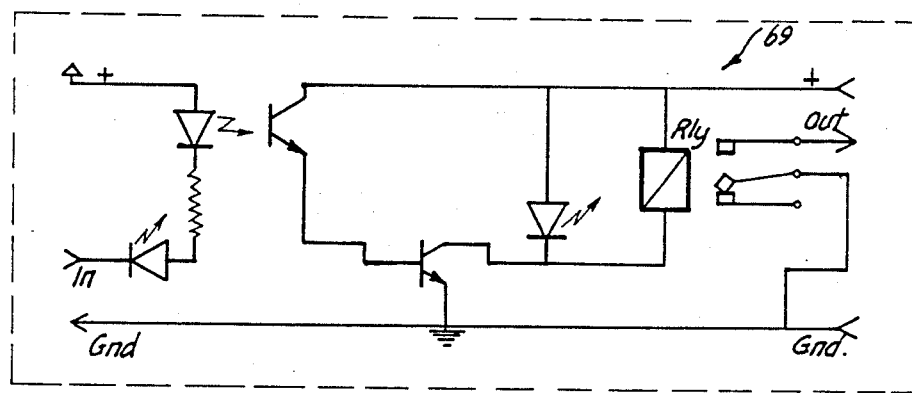
FIG. 6 is a specific example of an interface circuit between the memory of the circuit of FIG. 5 and the switches.

A specific example of a circuit which can be used in this control means of FIG. 4 is shown at FIG. 5. The components of FIG. 4 bear the same reference numerals in FIG. 5. FIG. 6 is a specific example of an interface circuit 69 for connecting the output of the memory to respective contactor switch in the set of switches 62.

Figure 7:
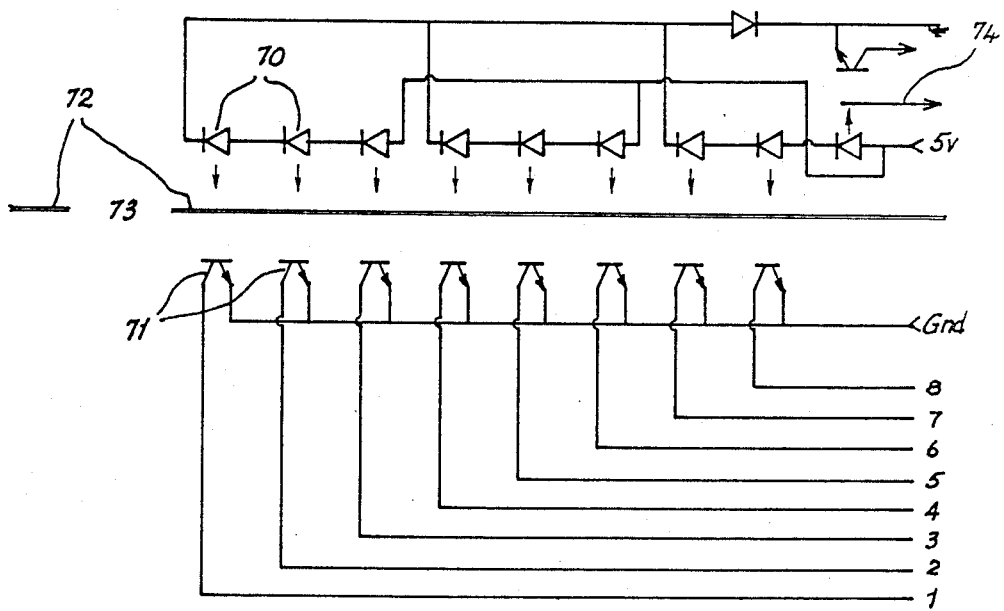
FIG. 7 is an example of an accelerator control for use with the third embodiment.

A specific example of the accelerator assembly is shown at FIG. 7. The accelerator assembly comprises an array of light emitting diodes 70 located in opposed relation to a corresponding number of photo electric sensors 71. A movable shutter 72 is mounted between the diodes 70 and sensors 71. The shutter contains an aperture 73 which has suitable dimensions such that at any position (except the end position) between the diodes 70 and sensors 71, two diodes and their respective sensors are exposed. As a result, two signals from the accelerator are delivered to two adjacent inputs of the eight possible inputs of the encoder 67. The accelerator shutter 72 is associated with another shutter 74 movable between a light emitting diode and sensor in cooperation with the optical accelerator shutter 74 to activate the master switch (MC) of the circuit.

If high order encoding were to be used, there would be no need for the optional master switch shutter 74 provided the associated diode and sensor were associated with the accelerator shutter and positioned adjacent the lowest voltage step (ie; 1). Also the shutter window can be infinitely wide.

In the circuit of FIG. 5 the encoder comprises an 8 line input to a 3 line output encoder 67 which is programmed to select the lowest of the input states received from the accelerator. As a result, the encoder translates the accepted input signal into the corresponding binary three digit signal for input into the memory 61. The memory stores the appropriate switching pattern for the battery circuit associated with the particular binary signal delivered from the encoder. The memory of the circuit of FIG. 5 comprises a memory bank having 32 addresses each capable of storing an 8 digit binary number. On a particular switching arrangement being selected from the memory the memory then activates the appropriate switches of the battery circuit of FIG. 3 through the inter face circuits 69. An example of a suitable interface circuit is shown at FIG. 6.

Referring now to table 3 which sets out the possible switching states available for all output levels of the battery circuit of the third embodiment it will be noticed that at an output level of 6 volts, 12 volts, 24 volts and 48 volts only one preferred switching state is required while at output levels of 18 volts and 36 volts two preferred switching states are required and at output levels of 30 volts and 42 volts, four preferred switching states are required. In order to equalise utilisation of each of the cells of the battery circuit it is necessary that where an alternative switching arrangement is available for a particular output voltage that each of those switching states be used. To effect such binary state of the memory which is associated with a selected accelerator level 1 to 8 is associated with four switching states for the battery circuit and each binary state is controlled by the clock circuit 63 and flip flops 64 to cyclically switch to each of the switching states associated with the particular binary state. In the case of accelerator inputs 1, 2, 4 and 8 each of the switching states are the same while in the case of accelerator inputs 3 and 6 there are two pairs of different switching states and in the case of accelerator inputs 5 and 7 there are four different switching states.

In addition, each switching state of each binary state includes a switching signal for the master switch of the battery circuit which is maintained ON in each switching state. Such an arrangement avoids the necessity for a separate switching circuit for the master switch.

The comparator 66 is associated with a sensor in the line between the battery circuit output and the load which is able to sense the presence of an excessive current. The encoder 67 has four outputs A, B, C and D which as previously mentioned can be associated with four accelerator input levels (i.e; 4, 3, 2 and 1 respectively). On the sensor providing a signal to the comparator which indicates an overload, situation the comparator will activate the appropriate output according to the degree of overload.

Where a minor overload exists one output (A) will be activated and where a large overload exists all outputs (A, B, C & D) will be activated.

The output signal from the comparator when it exists will override the output from the accelerator since the encoder has been programmed to accept the lowest of the input states received from either the accelerator or comparator. In addition, where a number of inputs are received from the comparator the encoder will select the lowest level input.

Where a large overload exists and the comparator has activated all of its outputs the encoder will provide a binary output corresponding to the lowest level available to the accelerator (i.e; 1) despite the fact that the accelerator may be set to level 8. As the degree of overload diminishes the lower order of outputs of the comparator are sequentially switched off and on output D switching off the encoder will then switch to the signal set by the accelerator and will maintain that situation provided an overload condition does not occur.

By means of the control circuit of FIG. 4 and the specific circuit of FIG. 5 and 6, a variable e.m.f. output can be obtained from a set of batteries whereby the batteries are protected from overload and are subjected to the same degree of load to ensure substantially equal utilisation of the batteries. Because accelerator steps 1 to 7 utilise parallel interconnection between the batteries, the power output is maximised at each step.

Figure 8:
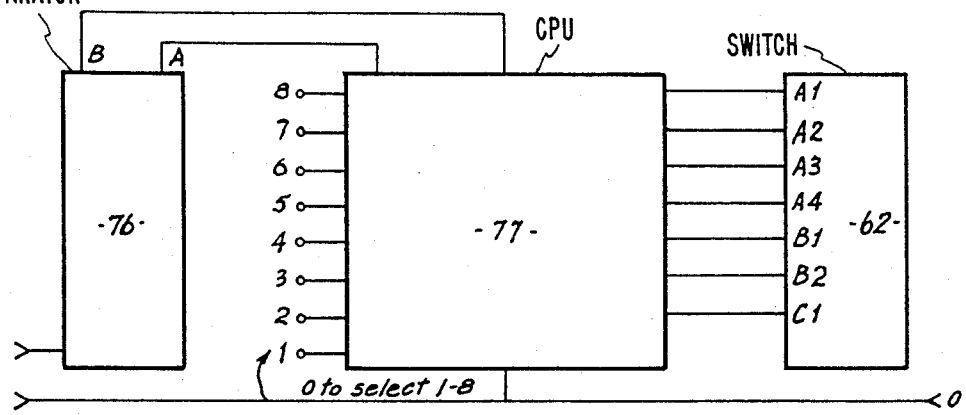
FIG. 8 is a block circuit diagram of another form of control means suitable for use with the third embodiment of FIG. 3.

Another form of control means is shown at FIG. 8 and utilises a micro-processor 77 which may have an auxilliary circuit (not shown) for periodically switching between the switching states for a particular voltage level. In addition the micro-processor is associated with a sensor such as a Hall effect device, (Hall probe) or shunt current sensor (not shown) and a comparator 76 which provides a first signal to the micro-processor via one line A when the current exceeds a predetermined limit and a second signal via a second line B when the current exceeds a higher predetermined limit.

A specific example of a circuit of the control means of FIG. 8 utilises an INTEL 8085 programmable microprocessor unit. The circuit uses the interface circuit of FIG. 6 between the output of the micro-processor and each of the switches of the set of switches 62. The micro-processor contains a memory of the same form as the memory 61 of FIG. 4 where each binary state has up to four switching states and a cycling means is provided for regularly switching to each state. Each switching state includes in its switching array an ON condition for the master switch of the battery circuit. In addition, the micro-processor incorporates the encoding function of the encoder 67 of FIG. 4 to translate the input information from the accelerator circuit into a binary information for activation of the memory. The comparator 76 takes the same form and use as that shown at FIG. 5 but can alternatively provide two flag signals for recognition by the program of the microprocessor. The first flag indicates that the magnitude of the current to the load has reached a predetermined range (current window) and that the voltage output to the load is not to be increased while the current remains within that range not withstanding an input from the accelerator for a higher level than that being supplied.

The second flag is raised when the load current (current window) exceeds the predetermined range in which case the comparator function of the comparator 66 of FIG. 5 is activated whereby the output voltage is switched to a lower level of any one of states 1 to 7 depending on the degree of overload.

If desired, the magnitude of the upper and lower levels of the predetermined range can be jointly varied in accordance With the selected output of the accelerator.

The micro-processor referred to above incorporates a timing circuit whereby the switching action between voltage outputs can be varied according to the desired operating parameters for the load. For instance where it is required to switch from one voltage to a higher voltage there should be some delay between each trip to enable the load to accommodate the increase in voltage as a gradual increase rather than as an instantaneous increase. This can be effected by programming a preset time delay between each upward step in voltage output to the load, into the micro-processor.

However when it is desired to decrease the voltage output, it is desirable in the case of electric driven vehicles to manually decrease the voltage immediately it is requested. To accommodate this function the microprocessor is programmed to provide the minimum delay when a decrease in voltage is signalled by the accelerator. In the case of an overload being sensed the microprocessor is programmed to sequentially step down to a lower level of e.m.f. and provide some time delay at each level to permit evaluation of whether an overload still exists.

It is also an action of the micro-processor that the memory contains an ON switching condition for the master switch for all of the switching states stored in the memory. In addition, on the accelerator moving to the position for a zero voltage output the micro-processor will momentarily switch the battery circuit to the minimum voltage output (i.e.; 1) before opening the master switch. A minimum voltage (i.e.; 1) is also selected and held for starting.

In the situation where the power supply is connected to an electrical motor which is also capable of producing its own e.m.f., the control means of FIGS. 4 and 7 may also be programmed such that the voltage supplied to the motor is enough to maintain a state of equilibrium. In the event that the voltage applied to the motor is less than that produced by the motor the voltage supply will be disconnected from the motor in order that the motor may freewheel. Alternatively a subsidiary circuit may be connected between the motor and the power supply in order that a charge voltage is applied to each of the cells within the circuit to regenerate the charge therein. This can be applied when the accelerator is in its 0 position and the resultant change is alternately applied to one half of the set of batteries in series and then to the other half with switch C1 being the dividing line.

If preferred, each battery may incorporate means for sensing the state of charge of each battery to provide the operator with an indication of the amount of charge ("fuel") available. In addition, the micro-processor can have means for scanning the output of each sensor to assess the degree of utilisation made of each battery. The micro-processor may also include means for varying the switching time for each battery through the clock circuit where it is found one or more batteries have been over utilised in relation to the other batteries.

Figure 10:
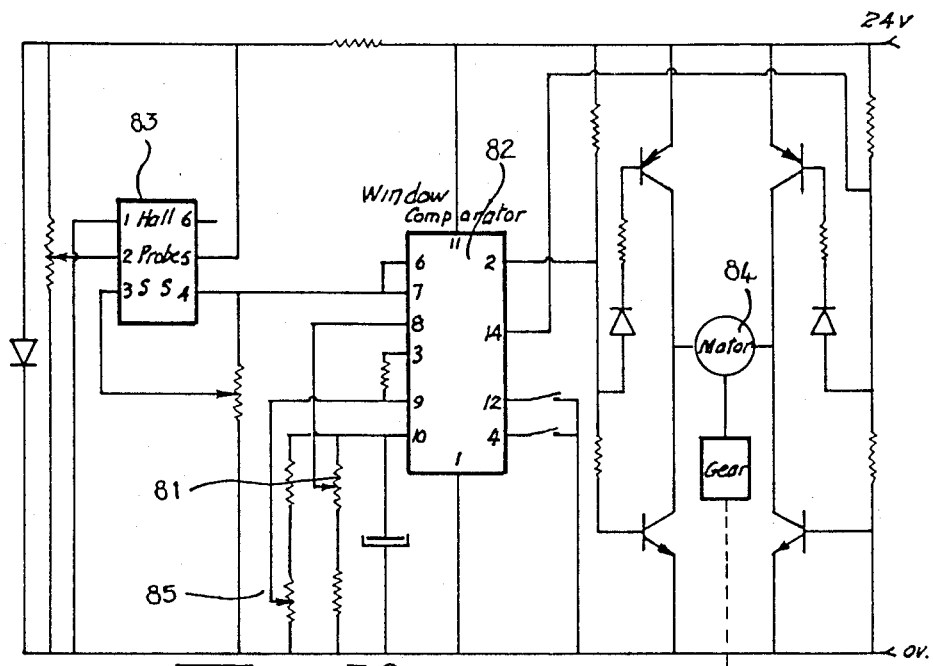
FIGS. 10 and 11 are two other forms of control means suitable for use with the third embodiment.

The form of control means shown at FIG. 10 utilises a servo operated accelerator to effect current control. The control comprises a manually operated potentiometer 81 which is operated by the operator connected to a window comparator 82 to set the desired current level in the load. A (Hall probe) sensor 83 which senses the current in the load is connected to the comparator.

The comparator is connected to a bridge network which controls the servo motor 84 for effecting movement of the accelerator control. The output from the comparator from terminal 2 is effected if the desired level set by the manual control is greater than that which exists in the load as sensed and thus the servo motor is activated to effect an increase. If the manual control is set at a lower level than that which exists in the load output 14 is activated to effectively produce a corresponding activation of the accelerator.

A second potentiometer 85 is incorporated to provide for a variable degree of free movement by the manual control without activation of the servo motor.

In the event of an overload being sensed in the load the comparator will activate output 14 to effect a decrease in the e.m.f. of the power supply. According to this form of control means the possibility of overload is reduced due to the constant simultaneous monitoring of the load current and settings of the manual control.

Figure 11:
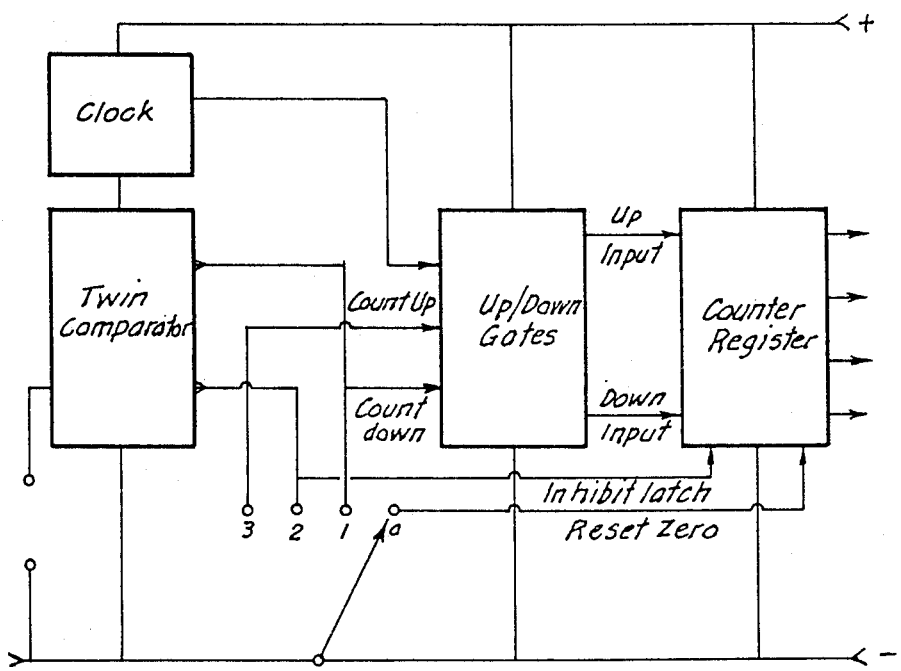

The form of control means of FIG. 11 comprises a current limited voltage control and provides a digital counter register to select typically 1 to 8 voltage setting for the Electrical Power Supply of FIG. 3. In the case of a vehicle the 4 position switch would operate as an accelerator. With the foot removed the switch would return to reset zero. Position 1 causes the counter to decrement (if already at zero and nothing will happen). Position 2 holds the setting, (if already on zero nothing will happen). Position 3 increments the counter at a rate which can be predetermined.

In this particular circuit the clock can be varied to provide pulses at intervals of 10 to 1,000 milliseconds, 100 milliseconds is a typical satisfactory figure for this circuit. The counter will increment from zero to 8 in this example provided that a predetermined current limit is not exceeded. Should this limit be reached the count will be inhibited and/or latched. If no limit is reached the counter can go to maximum 8. Should an unexpected overload occur whilst driving on a particular setting the signal 'go no faster' will be received.

Should a higher predetermined current limit be reached the signal 'go slower' will cause the counter to count down, even if the driver still has his foot depressed and selecting the count up position 3 on the accelerator switch. This is achieved by the logic switching which occurs within the circuit marked "up/down gates (down has priority)".

It should be appreciated that the invention need not be limited to the particular scope of the embodiment described above in particular scope of the embodiment described above and in particular any reference which is made to a cell may be taken to include the utilisation of a battery of cells of any type. Switches can be used in place of the diodes and solid state switching devices can be used in place of the switches. In addition, the source of e.m.f. may comprise any source of e.m.f. and need not be limited to batteries or cells.

The claims defining the invention are as follows:

1. An electrical power supply having an output of variable e.m.f., comprising: at least two pairs of source circuits, each of said source circuits comprising at least two sources of e.m.f. each connected in series with a first diode means, means including a first switch interconnecting the junction between the sources of e.m.f. and the respective first diode means of each source circuit, said first switch being effective to cause said sources of e.m.f. in each of said source circuit to energize terminals of said source circuits in parallel when said first switches are open and in series when said first switches are closed, each of said source circuits being connected in series with a second diode means, the series combination of each said source circuit and said second diode means being connected in parallel, means including a second switch interconnecting the junction between each said source circuits and said second diode means at the terminals of each said source circuits, and said second switch being effective to connect said source circuits in parallel when said second switch is open and said source circuits in series when said second switch is closed, control means sensitive to the requirements of the load connected to the power supply for opening and closing said first and second switches to vary the e.m.f. of said power supply, said control means including a memory having a memory state corresponding to each output level of e.m.f. of said power supply wherein at least one of said memory states contains several switching arrangements for said first and second switches which are able to produce a substantially equal e.m.f., said control means further including a clock circuit connected to said memory for cyclically switching to each switching state within a memory state for equalizing the use of said sources of e.m.f. over a time period.

2. An electrical power supply as claimed at claim 1, wherein said control means also comprises an encoder and a comparator; said memory having a memory state corresponding to each output level of e.m.f. of said power supply, the output of said memory being connected to said first and second switches, said encoder being connected between a manual control for said e.m.f. and said memory to translate the signal from said manual control into a form suitable for input into said memory, said comparator having an output connected to the common terminal of said encoder with a low e.m.f. input signal stages from said manual control, said comparator being connected with a sensor associated with said load, said sensor being capable of sensing the magnitude of current in said load wherein on said comparator receiving a signal from said sensor which indicates excessive current in the load an output signal is passed to said encoder to switch said memory to a memory state of lower e.m.f. than that signalled by the manual control.

3. An electrical power supply as claimed at claim 1 wherein the control means is capable of overriding a manual control for said e.m.f. and said control means comprising; a sensor to sense the magnitude of current from said source to said load; and a switching means connected to said sensor and to said load, wherein on said current exceeding a predetermined value, said switching means will cause the controller switch to lower the e.m.f. of said source to a level which will produce a current below said predetermined level, said switching means subsequently permitting said e.m.f. to increase to that set by the resultant manual control provided the current does not exceed said predetermined value.

4. An electrical power supply as claimed at claim 1 wherein the first and second switches and diode means are components mounted to a base comprising a laminate sheet formed of a central sheet of electrical insulating material and having bonded to each face a sheet of heavy duty electrically conductive material wherein each sheet of electrically conductive material is inherently load supportive, and each electrical conductive sheet is formed with a discontinuous pattern which exposes the central sheet; said switches and diode means being fixed to said base such that one of said conductive sheets is connected to one of the terminals of said components and the other is connected to the other terminal of the components and wherein the nature of the pattern on each sheet and the interconnection between the terminals of the components corresponds to the desired electrical interconnection between said diodes, switches and sources for said electrical power supply; the mounting of said switches and diode means also providing the electrical connection to the base.

5. An electrical power supply as claimed at claim 4 wherein each said sheet of electrically conductive material has a polarity different from the other and wherein the mountings of terminals for said components engage both sheets of electrically conductive material, the discontinuous pattern in the one sheet which has the opposite polarity to that of the terminal being such as to isolate the portion of the one sheet which is in contact with the mounting of the terminal from the remaining portion of said one sheet.

6. An electrical power supply as claimed at claim 3 or 5 wherein the sheets of electrically conductive material also serve as heat sinks for the components.

7. An electrical power supply as claimed at claim 6 wherein said base also supports microelectronic circuit components associated with said first and second switches.

8. An electrical power supply as claimed at claim 7 wherein the components are mounted to the base by means of an array of holes through said base the set of holes for each component being appropriately spaced.

9. An electrical power supply as claimed at claim 2 wherein said control means comprises a programmed micro-processor incorporating the functions of said memory, encoder, comparator and clock circuit.

10. An electrical power supply as claimed at claim 9 wherein on said e.m.f. output being reduced to zero by said manual control, said micro-processor initially provides an output to activate a switching state having the minimum e.m.f. output before disconnecting the power supply from said load.

11. An electrical power supply as claimed at claim 9 wherein said load is capable of producing its own e.m.f. and said sources comprise rechargeable batteries and said micro-processor is programmed to introduce said e.m.f. of said load to said sources on said e.m.f. of said load being greater than that supplied by the power supply.

12. An electrical power supply as claimed at claim 9 wherein said comparator has means to; prevent an increase in e.m.f. output being signalled to said memory by said manual control through said encoder when said current in said load is between a predetermined range; to reduce the e.m.f. output when said current is in excess of said predetermined range; and to permit the manual control to increase said e.m.f. output when said current is below said predetermined range.

13. An electrical power supply as claimed at claim 12 wherein each source comprises a battery and said micro-processor is programmed to vary the timing of the clock circuit to maximize utilization of each source.

14. An electrical power supply as claimed at claim 9 wherein said micro-processor provides for an increase in e.m.f. output being effected by a sequential stepping through each level of e.m.f. output of said power supply with a predetermined minimum time delay between each level.

15. An electrical power supply as claimed at claim 14 wherein said micro-processor provides for an immediate decrease in e.m.f. output on the appropriate signal being received by the memory through the manual control.

16. An electrical power supply as claimed at claim 15 wherein said micro-processor provides for sequential reduction in e.m.f. on an overload being sensed in the load with a predetermined time delay between each reduction step.

17. An electrical power supply as claimed at claim 16 wherein on activation of said manual control said microprocessor will maintain a switching state having a minimum output when connecting the power supply to the load.

* * * * *